(12) United States Patent
Homma

(10) Patent No.: US 11,541,694 B2
(45) Date of Patent: Jan. 3, 2023

(54) STUDDABLE TIRE AND PNEUMATIC TIRE

(71) Applicant: The Yokohama Rubber Co., LTD., Tokyo (JP)

(72) Inventor: Kenta Homma, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 201 days.

(21) Appl. No.: 16/961,650

(22) PCT Filed: Dec. 17, 2018

(86) PCT No.: PCT/JP2018/046354
§ 371 (c)(1),
(2) Date: Jul. 10, 2020

(87) PCT Pub. No.: WO2019/138792
PCT Pub. Date: Jul. 18, 2019

(65) Prior Publication Data
US 2021/0078368 A1 Mar. 18, 2021

(30) Foreign Application Priority Data
Jan. 11, 2018 (JP) .............................. JP2018-002738

(51) Int. Cl.
*B60C 11/117* (2006.01)
*B60C 11/16* (2006.01)
*B60C 11/03* (2006.01)

(52) U.S. Cl.
CPC ........ *B60C 11/1625* (2013.01); *B60C 11/032* (2013.01); *B60C 11/1656* (2013.01); *B60C 11/1668* (2013.01)

(58) Field of Classification Search
CPC .......................... B60C 11/1625; B60C 11/032
See application file for complete search history.

(56) References Cited

U.S. PATENT DOCUMENTS

2019/0135046 A1* 5/2019 Yasunaga ............ B60C 11/1637

FOREIGN PATENT DOCUMENTS

| EP | 2402178 A1 * | 1/2012 |
| EP | 3330105 A1 * | 6/2018 |

(Continued)

OTHER PUBLICATIONS

Partial machine translation for Japan 60-152501 U (Year: 2022).*
International Search Report for International Application No. PCT/JP2018/046354 dated Jan. 15, 2019, 4 pages, Japan.

*Primary Examiner* — Steven D Maki
(74) *Attorney, Agent, or Firm* — Thorpe North & Western

(57) ABSTRACT

A ground contact region of the tread portion of a studdable tire includes a center region located over a range corresponding to a length of 5 to 25% of a ground contact width from a tire centerline on each of both sides of the tire centerline in a tire width direction; and two shoulder regions located on both sides of the center region in the tire width direction. In each of the center region and the shoulder regions, a plurality of the stud pin installation holes are disposed along each of four or more pin arrangement lines extending in a tire circumferential direction. An average value of adjacent intervals between the pin arrangement lines in the center region is larger than an average value of adjacent intervals between the pin arrangement lines in each of the shoulder regions.

14 Claims, 5 Drawing Sheets

(56) References Cited

FOREIGN PATENT DOCUMENTS

| | | | |
|---|---|---|---|
| GB | 1480929 A | * | 7/1977 |
| GB | 1546780 A | * | 5/1979 |
| JP | S51-089605 | | 8/1976 |
| JP | S59-045203 | | 3/1984 |
| JP | 60-152501 U | * | 10/1985 |
| JP | 2007-050718 | | 3/2007 |
| JP | 2012-183954 | | 9/2012 |
| JP | 5993302 | | 9/2016 |
| WO | WO 2010/098092 | | 9/2010 |
| WO | WO 2014/103422 | | 7/2014 |
| WO | WO 2017/022683 | | 2/2017 |
| WO | WO-2017/022683 A1 | * | 2/2017 |

* cited by examiner

STUDDABLE TIRE AND PNEUMATIC TIRE

TECHNICAL FIELD

The present technology relates to a studdable tire including stud pin installation holes and a pneumatic tire.

BACKGROUND ART

A studded tire includes stud pins installed in a tread portion and provides grip on icy and snowy road surfaces.

Typically, stud pins are embedded in stud pin installation holes formed in the tread portion. In a case where a stud pin is embedded in a stud pin installation hole, the stud pin is inserted into the stud pin installation hole with the diameter expanded and firmly embedded in the stud pin installation hole. This prevents the stud pin from falling out from the stud pin installation hole due to an external force from the road surface during rolling.

Additionally, the stud pin generally includes a base portion and a tip portion protruding from one end surface of the base portion, and driving performance such as braking ability and driving ability on icy and snowy road surfaces is ensured by clawing into the ice and snow by the tip portion brought into contact with the road surface during rolling.

As a typical studded tire, a pneumatic studded tire is described in which studs are arranged in a tire circumferential direction in five or six rows in a tire width direction in a left and a right regions of a tread surface centered at a tire equatorial plane and ranging from a position corresponding to 33% of a tire ground contact width to a position corresponding to 95% of the tire ground contact width (Japan Unexamined Patent Publication No. c 2007-050718). Additionally, a method of designing a studded tire is known in which an arrangement of pin positions is set according to a predetermined procedure (Japan Patent No. 5993302).

However, it has been found that, in typical studded tires, a force that claws the road surface may be insufficient during braking, thus degrading braking performance.

SUMMARY

The present technology provides a studdable tire that provides a studded tire with excellent braking performance on icy and snowy road surfaces, and a pneumatic tire.

An aspect of the present technology is a studdable tire including a plurality of stud pin installation holes in a tread portion, a ground contact region of the tread portion including:

a center region located over a range corresponding to a length of 5 to 25% of a ground contact width from a tire centerline on each of both sides of the tire centerline in a tire width direction; and two shoulder regions located on both sides of the center region in the tire width direction, in each of the center region and the shoulder regions, two or more of the stud pin installation holes being disposed along each of four or more pin arrangement lines extending in a tire circumferential direction, and an average value of adjacent intervals between the pin arrangement lines in the center region is larger than an average value of adjacent intervals between the pin arrangement lines in each of the shoulder regions.

Each of the pin arrangement lines is an imaginary line for arranging the plurality of stud pins at intervals along the tire circumferential direction.

Preferably, the average value of the adjacent intervals between the pin arrangement lines in the center region is 102 to 120% of the average value of the adjacent intervals between the pin arrangement lines in the shoulder regions.

Preferably, with respect to two adjacent intervals of the adjacent intervals between the pin arrangement lines in the center region, a first interval A1 is equal to or larger than a second interval A2 between a pin arrangement line L1 included in two pin arrangement lines defining the first interval A1, the pin arrangement line L1 being located outward in the tire width direction, and a pin arrangement line L2 being outward adjacent to the pin arrangement line L1 in the tire width direction.

In each of the center region and the shoulder regions, the adjacent intervals between the pin arrangement lines may be equal.

Preferably, in each of the center region and the shoulder regions, the adjacent intervals between the pin arrangement lines decrease on a step-by-step basis or continuously outward in the tire width direction.

Preferably, an interval C between a first stud pin installation hole and a second stud pin installation hole disposed on a first pin arrangement line of the pin arrangement lines in the center region and being adjacent to each other in the tire circumferential direction is at least 2.5 times as long as an interval D in the tire circumferential direction between the first stud pin installation hole and a third stud pin installation hole disposed on a second pin arrangement line different from the first pin arrangement line and being closest to the first stud pin installation hole.

The second pin arrangement line is a pin arrangement line on which a stud pin installation hole closest to the first stud pin installation hole is disposed.

Preferably, the interval between two stud pin installation holes disposed on the first pin arrangement line of the pin arrangement lines in the center region and being adjacent to each other in the tire circumferential direction is ⅓ or greater of a ground contact length in the tire circumferential direction.

Preferably, an interval in the tire circumferential direction between the first stud pin installation hole disposed on the first pin arrangement line of the pin arrangement lines in the center region and a fourth stud pin installation hole disposed on a third pin arrangement line adjacent to the first pin arrangement line and being closest to the first stud pin installation hole is disposed at an interval at least ⅕ of the ground contact length in the tire circumferential direction.

The third pin arrangement line may be the same pin arrangement line as the second pin arrangement line.

An aspect of the technology is a pneumatic tire including:
stud pins, and
the studdable tire including stud pin installation holes in which the stud pins are installed.

A plurality of the stud pins are provided and installed in respective stud pin installation holes.

According to the stud pin of an embodiment of the present technology, a studded tire is obtained that provides excellent braking performance on icy and snowy road surfaces.

DETAILED DESCRIPTION

A pneumatic tire according to embodiments of the present technology will be described below in detail.

Overall Description of Tire

Figure 1:
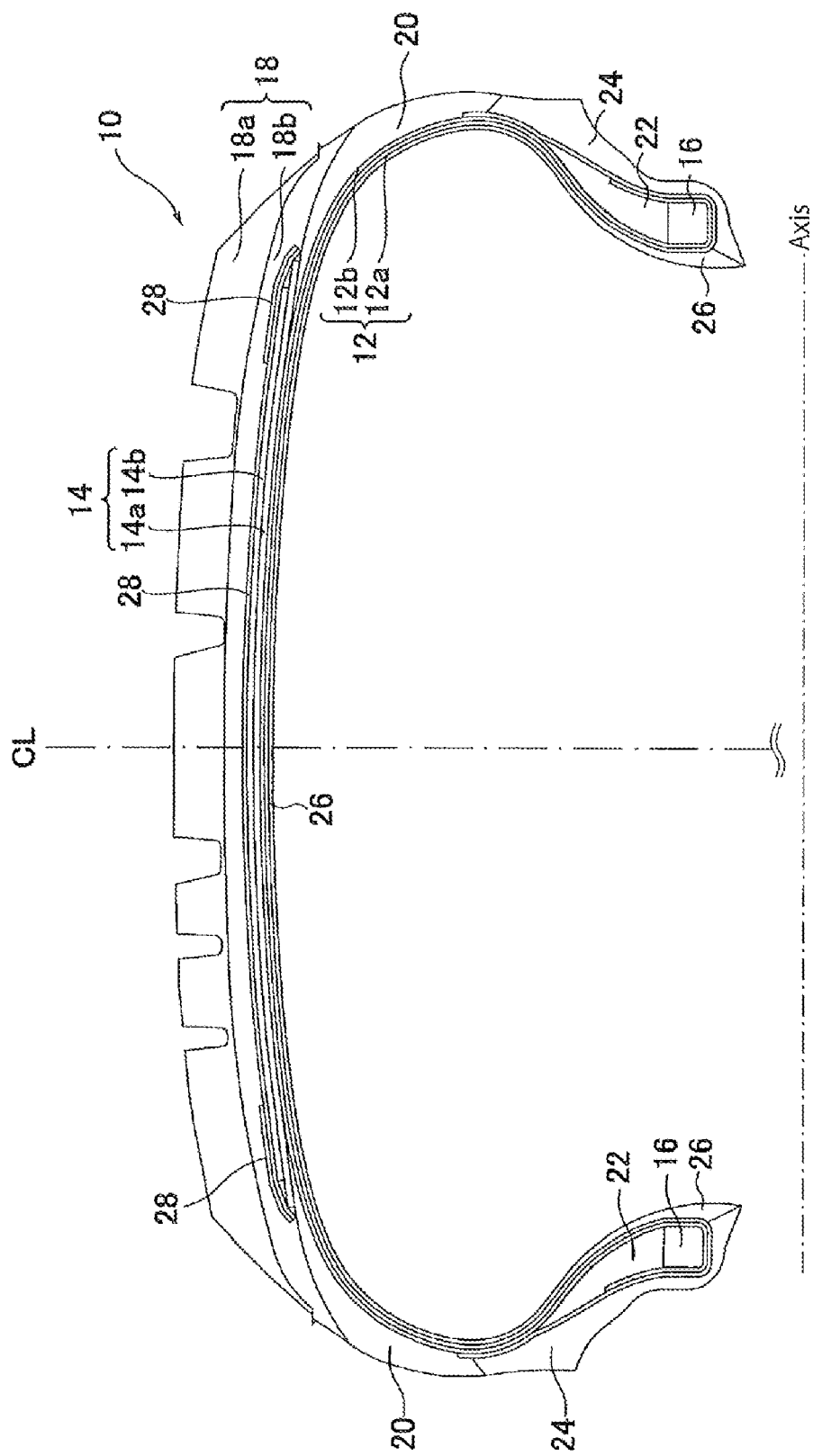
FIG. 1 is a tire cross-sectional view illustrating a cross-section of a pneumatic tire of an embodiment.

Below, a pneumatic tire of the present embodiment is described. FIG. 1 is a tire cross-sectional view illustrating a cross-section of a pneumatic tire (hereinafter referred to as "tire") 10 of the present embodiment along a tire radial direction. The tire 10 is a studded tire with stud pins embedded in a tread portion.

The tire 10 is, for example, a tire for a passenger vehicle. The tire for a passenger vehicle refers to a tire specified in Chapter A of the JATMA Year Book 2015 (standards of The Japan Automobile Tyre Manufacturers Association, Inc.). The tire can also be a small truck tire specified in Chapter B or a truck tire or bus tire specified in Chapter C.

"Tire circumferential direction" described below refers to the direction (both rotation directions) in which the tread surface rotates when the tire 10 rotates about a tire rotation axis Axis. "Tire radial direction" refers to the direction that extends orthogonally to the tire rotation axis. "Outward in the tire radial direction" refers to the direction away from the tire rotation axis in the tire radial direction. "Inward in the tire radial direction" refers to the direction towards the tire rotation axis in the tire radial direction. "Tire width direction" refers to the direction parallel with the tire rotation axis direction. "Outward in the tire width direction" refers to the directions away from a tire centerline CL of the tire 10. "Inward in the tire width direction" is the direction towards the tire centerline CL of the tire 10 in the tire width direction.

Tire Structure

The tire 10 mainly includes a pair of bead cores 16, a carcass ply layer 12, and a belt layer 14 as framework members, and includes, around the framework members, a tread rubber member 18, side rubber members 20, bead filler rubber members 22, rim cushion rubber members 24, and an innerliner rubber member 26.

The pair of bead cores 16 are annular members disposed at both end portions in the tire width direction, inward in the tire radial direction.

The carcass ply layer 12 includes one or more carcass ply members 12a, 12b, which are made of organic fibers covered with rubber. The carcass ply members 12a, 12b are wound between the pair of bead cores 16 to form a toroidal shape.

The belt layer 14 includes a plurality of belt members 14a, 14b. The belt layer 14 is disposed outward of the carcass ply layer 12 in the tire radial direction and is wound in the tire circumferential direction. The inner belt member 14a in the tire radial direction has a width in the tire width direction greater than the width of the outer belt member 14b in the tire radial direction.

The belt members 14a, 14b are members made of steel cords covered with rubber. The steel cords of the belt member 14a and the steel cords of the belt member 14b are disposed inclined at a predetermined angle of, for example, from 20 to 30 degrees, with respect to the tire circumferential direction. The steel cords of the belt members 14a, 14b are inclined in opposite directions with respect to the tire circumferential direction and cross one another. The belt layer 14 suppresses expansion of the carcass ply layer 12 caused by the pressure of the air in the tire 10.

The tread rubber member 18 is disposed outward of the belt layer 14 in the tire radial direction. The side rubber members 20 are connected to both end portions of the tread rubber member 18. The tread rubber member 18 is made of two layers, an upper layer tread rubber member 18a disposed outward in the tire radial direction and a lower layer tread rubber member 18b disposed inward in the tire radial direction. The upper layer tread rubber member 18a is provided with circumferential grooves, lug grooves, and stud pin installation holes (see FIG. 2). The tread surface has, with respect to the tire width direction, an inclination angle increasing outward in the tire width direction.

The rim cushion rubber members 24 are provided at inner ends of the side rubber members 20 in the tire radial direction. The rim cushion rubber members 24 come into contact with the rim on which the tire 10 is mounted. The bead filler rubber member 22 is provided on the outer side of the bead core 16 in the tire radial direction so as to be interposed between the carcass ply layer 12 wound around the bead core 16. The innerliner rubber member 26 is provided on the inner surface of the tire 10 facing a tire cavity region that is filled with air and is surrounded by the tire 10 and the rim.

In addition, the tire 10 is provided with a belt cover layer 28 that covers the outer surface of the belt layer 14 in the tire radial direction. The belt cover layer 28 is made of organic fibers covered with rubber.

Tread Pattern and Stud Pins

Figure 2:
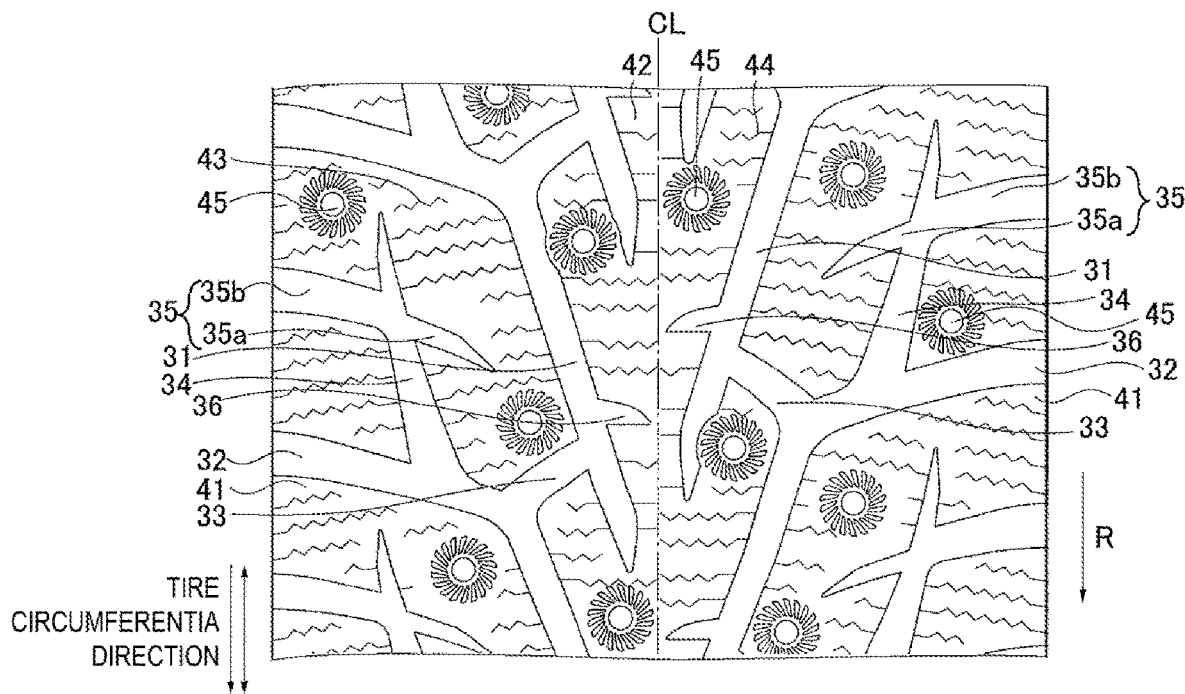
FIG. 2 is a diagram illustrating an example of a tread pattern applied to the pneumatic tire in FIG. 1.

FIG. 2 is a developed plan view illustrating a portion of the tread pattern of a tread pattern 30 of the tire 10 developed on a plane. Note that the tread pattern employed in the tire 10 is not limited to the tread pattern 30. The stud pins (see FIG. 3) are mounted in pin installation holes 45 described below.

As illustrated in FIG. 2, the tire rotation direction R is designated for the tire 10 and indicates a one-way orientation in the tire circumferential direction. The orientation of the tire rotation direction R is designated by a number, a symbol, and the like provided on sidewall surfaces of the tire 10.

The tread pattern 30 is provided with a plurality of first inclined grooves 31, a plurality of first lug grooves 32, a plurality of second inclined grooves 33, a plurality of third inclined grooves 34, second lug grooves 35, and fourth inclined grooves 36. In FIG. 2, the reference sign CL denotes the tire centerline.

The first inclined grooves 31 are provided in plurality in the tire circumferential direction. Each of the first inclined grooves 31 has a position located away from the tire centerline CL as a starting end, extends from the starting end in the opposite direction to the tire rotation direction R, and extends at an inclination outward in the tire width direction.

The first lug grooves 32 are provided in plurality in the tire circumferential direction. The first lug grooves 32 extend from the end portion of the first inclined grooves 31 on the outer side in the tire width direction in the opposite direction to the tire rotation direction R and extend at an inclination towards the outer side in the tire width direction beyond the ground contact edge.

The second inclined grooves 33 are provided in plurality in the tire circumferential direction. The second inclined grooves 33 extend from the end portion of the first inclined grooves 31 on the outer side in the tire width direction in the opposite direction to the tire rotation direction R and extend at an inclination towards the inner side in the tire width direction reaching an adjacent first inclined groove 31.

The third inclined grooves 34 are provided in plurality in the tire circumferential direction. Each of the third inclined grooves 34 extends from an intermediate point on the first lug grooves 32 in the opposite direction to the tire rotation direction R and extends at an inclination towards the outer side in the tire width direction. The third inclined grooves 34 have a shape in which the groove width gradually narrows towards the outer side in the tire width direction and gradually widens towards the inner side in the tire width direction.

The second lug grooves 35 extend between two of the first lug grooves 32 located adjacent to each other in the tire circumferential direction aligned with the first lug grooves 32 without crossing with the first inclined grooves 31 and the second inclined grooves 33.

The third inclined grooves 34 extend through the second lug grooves 35. The width of portions 35a of the second lug grooves 35 on the inner side in the tire width direction of the crossing sections with the third inclined grooves 34 is narrower than the width of portions 35b on the outer side in the tire width direction of the crossing sections with the third inclined grooves 34.

The fourth inclined grooves 36 extend from an intermediate point on the first inclined grooves 31 in one direction in the tire circumferential direction and extend at an inclination towards the inner side in the tire width direction.

Sipes 43 are provided in the land portions 41 enclosed by the first inclined grooves 31, the first lug grooves 32, the second inclined grooves 33, and the tread ground contact edges. Also, sipes 44 are provided in land portions 42 on the inner side in the tire width direction of the first inclined grooves 31 and the second inclined grooves 33. The sipes 44 extend substantially parallel with the tire width direction. The sipes 43 incline with respect to the sipes 44. With the sipes 43 being inclined with respect to the sipes 44, it is possible to increase the turning performance of the tire 10.

Stud pin installation holes 45 are each provided in the land portion 41 enclosed by the first inclined groove 31, the first lug groove 32, the second inclined groove 33, and the tread ground contact edge, and in the land portion 42 located inward from the first inclined groove 31 and the second inclined groove 33 in the tire width direction, as illustrated in FIG. 2. By mounting stud pins 50, which are described below, in the stud pin installation holes 45, the tire 10 functions as a studded tire, and the performance on ice, namely the braking on ice and the turning on ice performances, is improved.

Figure 3:
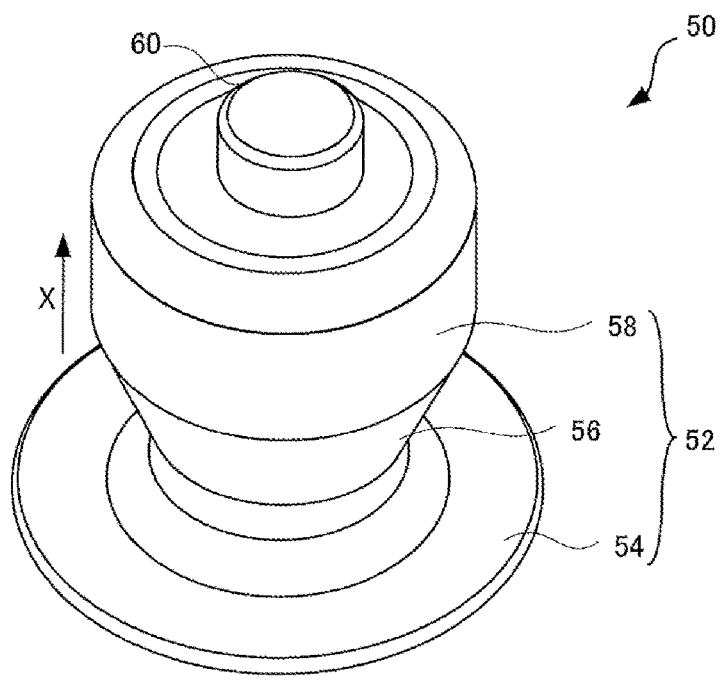
FIG. 3 is a diagram illustrating an example of a stud pin of the pneumatic tire.

FIG. 3 is an external perspective view illustrating an example of the stud pin 50.

The stud pin 50 mainly includes a buried base portion 52 and a tip portion 60. The buried base portion 52 is embedded in the tread portion of the tire 10. The stud pin 50 is fixed in the tread portion by a side surface of the buried base portion 52 being pressed by the tread rubber member 18 via a side surface of the stud pin installation hole 45. In the stud pin 50, the buried base portion 52 and the tip portion 60 are formed in this order along the direction X. The buried base portion 52 includes a bottom portion 54, a shank portion 56, and a body portion 58 along the direction X. Note that the direction Y corresponds to the extension direction of the buried base portion 52 towards the tip portion 60, and aligns with the normal line direction relative to the tread surface of the tread portion in a case where the stud pin 50 is mounted in the stud pin installation hole 45.

Arrangement Configuration of Stud Pin Installation Holes

Now, the arrangement configuration of the stud pin installation holes 45 will be described.

Figure 4:
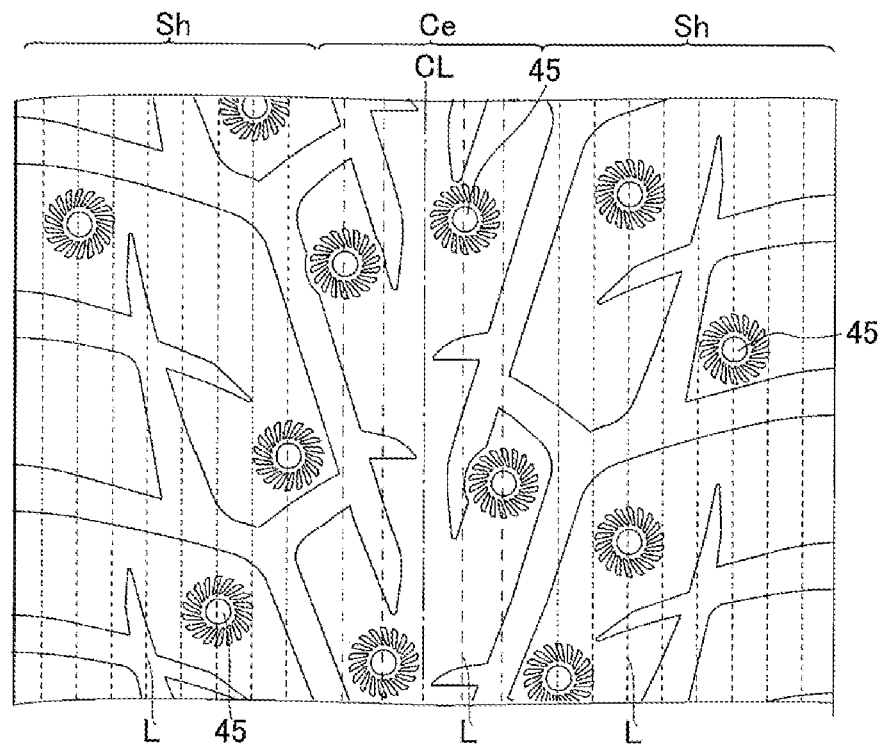
FIG. 4 is a diagram illustrating pin arrangement lines in the tread pattern of FIG. 2.

FIG. 4 is a diagram illustrating pin arrangement lines L in the tread pattern 30 of FIG. 2. In FIG. 4, illustration of the sipes 43 and 44 of the tread pattern of FIG. 2 are omitted.

A ground contact region of the tread portion includes a center region Ce and two shoulder regions Sh.

The center region Ce is located on both sides of a tire centerline CL in the tire width direction over a range corresponding to a length of 5 to 25% of a ground contact width. The shoulder region Sh is a region located on both sides of the center region Ce in the tire width direction.

The ground contact region is a region of the tread surface serving as the ground contact surface in a case where the tire is brought into contact with a horizontal surface, under a condition that the tire 10 is mounted on a regular rim, inflated to the regular internal pressure, and loaded with 88% of the regular load. The ground contact width is the length in the tire width direction between both ends (ground contact edges) of the ground contact surface in the tire width direction. "Regular rim" refers to a "measurement rim" defined by JATMA, a "Design Rim" defined by TRA (The Tire and Rim Association, Inc.), and a "Measuring Rim" defined by ETRTO (European Tire and Rim Technical Organization). "Regular internal pressure" refers to a "maximum air pressure" defined by JATMA, to the maximum value in "TIRE LOAD LIMITS AT VARIOUS COLD INFLATION PRESSURES" defined by TRA, or to "INFLATION PRESSURES" defined by ETRTO. "Regular load" refers to a "maximum load capacity" defined by JATMA, to the maximum value in "TIRE LOAD LIMITS AT VARIOUS COLD INFLATION PRESSURES" defined by TRA, or to "LOAD CAPACITY" defined by ETRTO.

According to one embodiment, from the perspective of ensuring braking performance by the center region Ce, the center region Ce is located on both sides of the tire centerline CL in the tire width direction over a range corresponding to a length of 15 to 25%, preferably 15 to 20%, of the ground contact width.

In each of the center region Ce and the shoulder regions Sh, a plurality of the stud pin installation holes 45 of the stud pin installation holes 45 are disposed along each of four or more pin arrangement lines L extending in the tire circumferential direction. The pin arrangement lines L are imaginary lines for arranging the plurality of stud pins 50 at intervals along the tire circumferential direction. The plurality of stud pin installation holes 50 disposed along the pin arrangement lines L form hole rows extending in the tire circumferential direction. In other words, in the present embodiment, each of the center region Ce and the shoulder regions S includes four or more hole rows. The center of the tread surface of each of the plurality of stud pin installation holes 50 disposed along the pin arrangement lines L passes through the pin arrangement line L. By disposing the stud pin installation holes 45 in both the center region Ce and each shoulder region Sh, braking performance and turning performance on icy road surfaces are ensured. In addition, since the four or more pin arrangement lines L are provided in each of the center region Ce and the shoulder regions Sh (the two shoulder regions Sh illustrated in FIG. 4), the number of stud pins 50 disposed on one pin arrangement line L is not excessively large, and the stud pins 50 can be distributively arranged in the tire width direction.

Note that the number of stud pins 50 mounted on the tire 10 is 90 to 200, for example. The number of stud pins 50 disposed on one pin arrangement line L is, for example, 5 to 12. On one side (half-tread region) in the tire width direction with reference to the tire centerline CL, the numbers of stud pins 50 disposed in the center region Ce and in each shoulder region Sh are set, for example, according to the ratio between the number of the pin arrangement lines L in the center region Ce and the number of the pin arrangement lines L in one of the two shoulder regions Sh, and are the same in a case where the ratio is 1:1.

In the half-tread region, the number of pin arrangement lines L in each of the center region Ce and the shoulder regions Sh is, for example, 2 to 10. In the example illustrated in FIG. 4, in the half-tread region, three pin arrangement lines L including the pin arrangement line L passing through the tire centerline CL are set in the center region Ce, and eight pin arrangement lines L are set in the shoulder region Sh.

The average value (average interval) of a plurality of adjacent intervals between the pin arrangement lines L in the center region Ce is larger than the average value (average interval) of a plurality of adjacent intervals between the pin arrangement line L in the shoulder region Sh.

During braking, for example, in a state where the tire is fully locked, ice and snow shaved by the stud pins brought into contact with the road surface may remain on the road surface to inhibit rear stud pins having previously come into contact with the ground from clawing the road surface, leading to degraded braking performance. In general, the tread portion has a rounded shape in which the inclination angle of the tread surface with respect to the tire width direction increases as the tread portion extends outward from the tire centerline CL in the tire width direction. Thus, in the shoulder regions, the ice and snow shaved by the stud pins are likely to be discharged outward in the width direction, while, in the center region, the ice and snow are likely to accumulate in the ground contact surface, leading to a reduced clawing force of the stud pins. In addition, the center region has a higher ground contact pressure than the shoulder regions and thus involves a large amount of ice and snow shaved by the stud pins. This leads to a significant decrease in clawing force of the stud pins in the center region.

In the present embodiment, the average interval between the pin arrangement lines L in the center region Ce is set larger than the average interval between the pin arrangement lines L in the shoulder regions Sh, restraining the ice and snow shaved by the stud pins 50 located forward in the vehicle advancement direction from remaining on the path of the rear stud pins 50. This allows suppression of a reduction in the clawing force of the rear stud pins 50. The center region Ce has a high ground contact pressure, and the stud pins 50 in the center region Ce contribute particularly to braking, and thus the braking performance on icy and snowy road surfaces is improved according to the present embodiment.

In addition, a small average interval between the pin arrangement lines is likely to cause traces (grooves), on the road surface, of shaving by the front stud pins to be treaded by the rear stud pins and may thus reduce the force that claws the road surface. However, in the present embodiment, because the average interval between the pin arrangement line L of the center region Ce is wider than the shoulder region Sh, the rear stud pin 50 is prevented from clawing the scars on the road surface, and the reduction in the force that claws the road surface is suppressed. This also improves the braking performance on icy and snowy road surfaces.

According to one embodiment, for suppression of a reduction in the clawing force of the rear stud pins 50 due to ice and snow shavings, the average interval between the pin arrangement lines L in the center region Ce is preferably 102% or greater and more preferably 105% or more of the average interval between the pin arrangement lines L in each shoulder region Sh.

On the other hand, in a case where the intervals between the pin arrangement lines L in the center region Ce are excessively large, a reduced number of stud pins 50 in the center region Ce may degrade the braking performance. Here, in a case where the intervals between the pin arrangement lines L in the center region Ce are increased, while the number of stud pins 50 in the center region Ce is not reduced in order to avoid degrading the braking performance, the number of stud pins 50 on each pin arrangement line L is increased, and the traces, on the road surface, of shaving by the front stud pins 50 are likely to be treaded by the rear stud pins 50. Thus, according to one embodiment, the average interval between the pin arrangement lines L in the center region Ce is preferably 120% or less and more preferably 115% or less of the average interval between the pin arrangement lines L in each shoulder region Sh.

Figure 5:
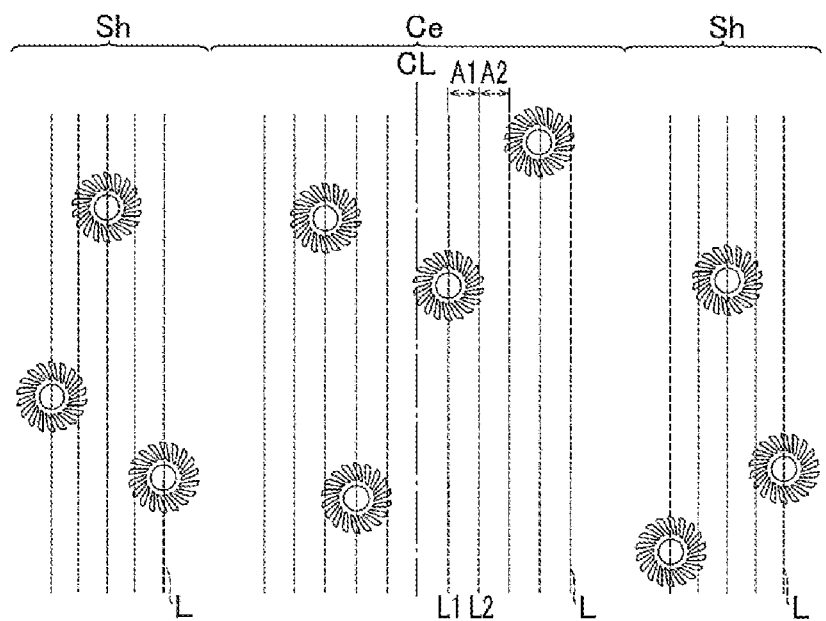
FIG. 5 is a diagram illustrating an example of a configuration of stud pin arrangement.
Figure 6:
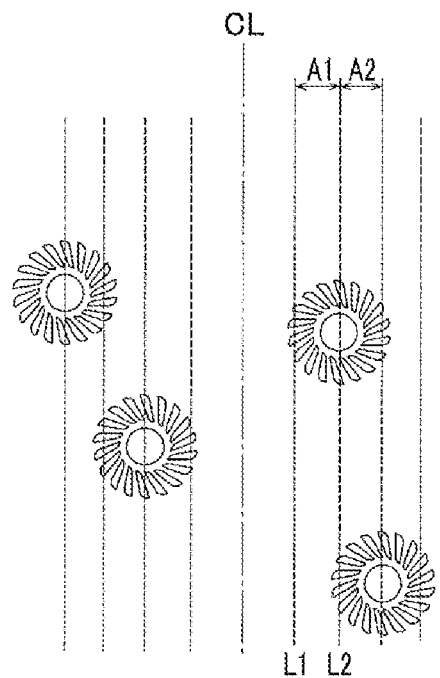
FIG. 6 is a diagram illustrating another example of the configuration of stud pin arrangement.

FIG. 5 is a diagram illustrating an example of an arrangement configuration of the stud pins 50. FIG. 6 is a diagram illustrating another example of the arrangement configuration of the stud pins. In the following figures, illustration of a tread pattern is omitted. The numbers of pin arrangement lines L in the center region Ce and in the shoulder regions Sh in FIG. 5 and FIG. 6 are different from the respective numbers of pin arrangement lines L in FIG. 4.

In the example illustrated in FIG. 5, the interval between adjacent pin arrangement lines L in the center region Ce is constant. In the example illustrated in FIG. 6, the interval between adjacent pin arrangement lines L in the center region Ce continuously decreases outward in the tire width direction.

According to one embodiment, as illustrated in FIG. 5 and FIG. 6, for any two adjacent intervals A1 and A2 of the adjacent plurality of intervals between the pin arrangement lines L in the center region Ce, the interval A1 (first interval) is equal to or larger than the interval A2 between a pin arrangement line L1 included in the two pin arrangement lines defining the interval A1 (first interval), the pin arrangement line L1 being located outward in the tire width direction, and a pin arrangement line L2 located outward adjacent to the pin arrangement line L1 in the tire width direction. In such a configuration, the intervals each between adjacent pin arrangement lines L in the center region Ce are constant or decrease on a step-by-step basis or continuously outward in the tire width direction. Ice and snow shaved by the stud pins 50 are more likely to be collected in a part of the ground contact region closer to the tire centerline CL. Thus, the above-described configuration can reliably suppress a reduction in clawing force of the stud pins 50 in a region of the center region Ce closer to the tire centerline CL. From this perspective, as illustrated in FIG. 6, the interval A1 is particularly preferably wider than the interval A2.

On the other hand, in each of the center region Ce and the shoulder regions Sh, the intervals each between adjacent pin arrangement lines are preferably equal as illustrated in FIG. 5. The equal intervals each between the pin arrangement lines L in the center region Ce allows the stud pins located outward in the tire width direction in the center region Ce to be inhibited from treading traces of shaving by the stud pins 50 on the adjacent pin arrangement line L.

Figure 7:
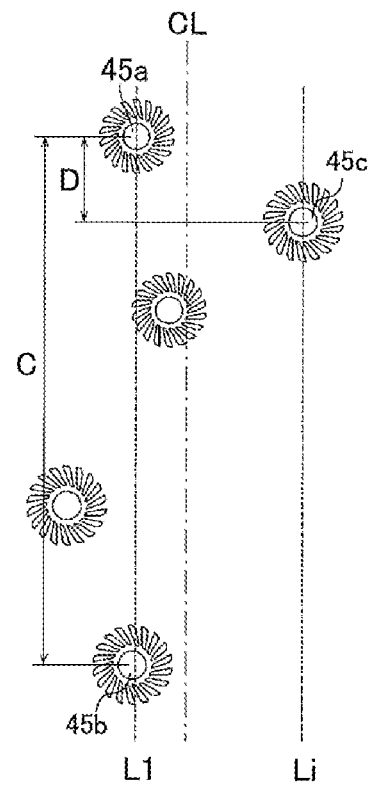
FIG. 7 is a diagram illustrating another example of the configuration of stud pin arrangement.

FIG. 7 is a diagram illustrating another example of the arrangement configuration of the stud pins 50. In the following figures, only some of the pin arrangement lines are illustrated.

According to an embodiment, as illustrated in FIG. 7, preferably, an interval C between stud pin installation holes 45*a* and 45*b* (first stud pin installation hole and second stud pin installation hole) disposed adjacent in the tire circumferential direction and on the pin arrangement line L1 (first pin arrangement line) of the pin arrangement lines L in the center region Ce is at least 2.5 times as large as an interval D in the tire circumferential direction between the stud pin installation hole 45*a* and a stud pin installation hole 45*c* (third stud pin installation hole) located closest to the stud pin installation hole 45*a* and on a pin arrangement line Li (second pin arrangement line) different from the pin arrangement line L1. The pin arrangement line Li is a pin arrangement line on which the stud pin installation hole 45*c* closest to the stud pin installation hole 45*a* is disposed. Note that in the following description, the interval between the two stud pin installation holes means the interval between the center positions of the stud pin installation holes in the tread surface. A small interval between the plurality of stud pins disposed on one pin arrangement line may cause a part of the road surface shaved by the front stud pins to be clawed again by the rear stud pins during braking. This may prevent a sufficient clawing force from being obtained and increase the braking distance. In this configuration, with the stud pins 50 disposed with C/D≥2.5 satisfied, a possible increase in braking distance is suppressed. Preferably, C/D≥3.5. The upper limit value of C/D is, for example, 5.

Figure 8:
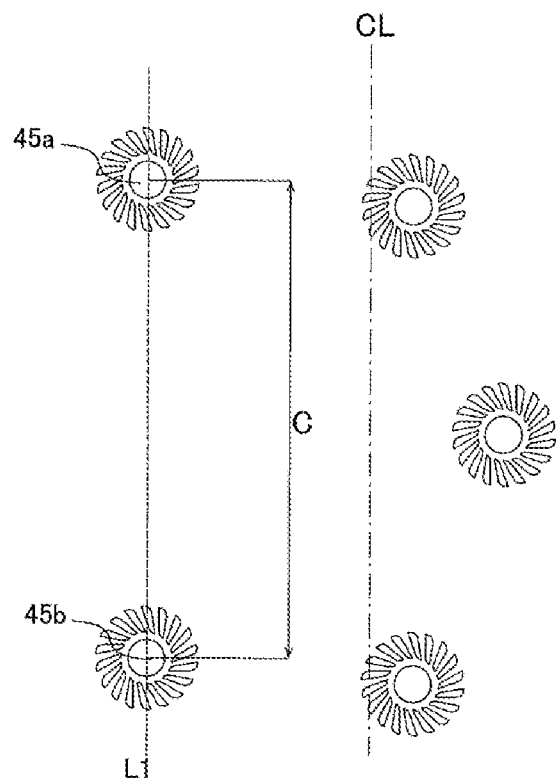
FIG. 8 is a diagram illustrating another example of the configuration of stud pin arrangement.

FIG. 8 is a diagram illustrating another example of the arrangement configuration of the stud pins 50.

According to an embodiment, as illustrated in FIG. 8, the interval C between stud pin installation holes 45*a* and 45*b* disposed adjacent in the tire circumferential direction and on the pin arrangement line L1 of the pin arrangement lines L in the center region Ce corresponds to a length that is ⅓ or greater of the ground contact length in the tire circumferential direction. Here, "ground contact length" refers to the tire circumferential direction length of the ground contact patch at the position in the tire width direction where the pin arrangement line L1 is located. The interval C being ⅓ or more of the ground contact length provides an appropriate interval between the plurality of stud pins 50 disposed on one pin arrangement line L, restraining a part of the road surface shaved by the front stud pins 50 from being clawed again by the rear stud pins 50 during braking. This may suppress a failure to obtain a sufficient clawing force, leading to an extended braking distance.

The upper limit value of the interval C is ½, for example.

Figure 9:
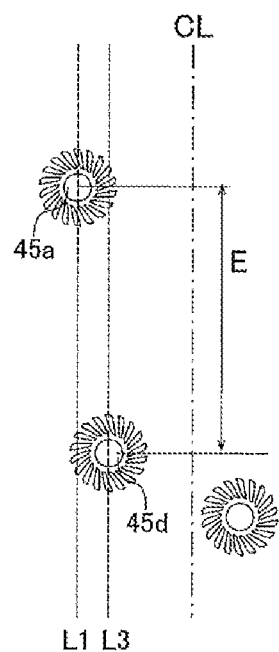
FIG. 9 is a diagram illustrating another example of the configuration of stud pin arrangement.

FIG. 9 is a diagram illustrating another example of the arrangement configuration of the stud pins 50.

According to an embodiment, as illustrated in FIG. 9, an interval E in the tire circumferential direction between the stud pin installation hole 45*a* disposed on the pin arrangement line L1 of the pin arrangement lines L in the center region Ce and a stud pin installation hole 45*d* (fourth stud pin installation hole) disposed on the pin arrangement line L3 (third pin arrangement line) adjacent to the pin arrangement line L1 and being closest to the stud pin installation hole 45*a* is disposed at an interval at least ⅕ of the ground contact length in the tire circumferential direction. The pin arrangement line L3 is one of the pin arrangement lines Li described above. Here, "ground contact length" refers to the tire circumferential direction length of the ground contact surface at the position in the tire width direction where the pin arrangement line L3 is located. The interval E being less than ⅕ of the ground contact length may cause ice and snow shaved by the stud pins 50 to remain on the path of the stud pins 50 on the next pin installation line L, thus reducing the clawing force. In this embodiment, the interval E being equal to or greater than ⅕ of the ground contact length (E≥(ground contact length/5)) suppresses a reduction in clawing force of the stud pin 50. The upper limit value of the interval E is, for example, ⅓.

EXAMPLES AND COMPARATIVE EXAMPLE

For confirmation of the effects of the present technology, four studded tires each having a tire size of 205/55R16 94T were fabricated for each of Examples and Comparative Example, and mounted on a front wheel drive passenger car having an engine displacement of 2L. The braking performance on ice was examined. The vehicle has a rim size of 16×6.5J, and the air pressure is 210 kPa.

For the tires and tread patterns in Examples 1 to 6, the configurations described in the embodiments and illustrated in FIG. 1 to FIG. 4 are used except for the points shown in Table 1. In Example 1 to 6, the average interval A between the pin arrangement lines L in the center region Ce is 6.5 mm, and the average interval B between the pin arrangement lines L in each shoulder regions Sh is 6 mm.

The stud pins in Comparative Example are similar to the stud pins in Example 2 except that the average interval A is 6 mm.

In Table 1, "pin arrangement" refers to the size relationship between the average interval A and the average interval B described above.

"Pin arrangement in the center region" means the size relationship between the above-described adjacent intervals A1 and A2 in the center region Ce, "A1<A2" manes that the interval increases outward in the width direction, "A1>A2" means that the interval decreases outward in the width direction, and "A1=A2" means that the intervals A1 and A2 are equal. In Examples 1 to 6, the interval between the adjacent pin arrangement lines L is varied within a range from 6 to 7 mm (6 mm in Example 2) in the center region Ce and from 5.5 to 6.5 mm in each shoulder regions.

The "minimum interval C/D" on the same pin arrangement line with respect to the interval D between pins closest to each other indicates the value of C/D, "the minimum interval C on the same pin arrangement line with respect to the ground contact length" indicates the value of the interval C≥(contact length/3) described above, and the "minimum interval E on the adjacent pin arrangement lines with respect to the ground contact length" indicates the value of the interval E≥(ground contact length/5) described above.

Braking Performance on Ice

The distance (braking distance) is measured over which the travel speed of the vehicle running at a travel speed of 20 km/hr is reduced to 5 km/hr by pressing the brake pedal at a constant force to the deepest position. The reciprocal of the measured distance is used as an index value, with Comparative Example being assigned the value of 100. Larger index values indicate shorter distances and more excellent breaking performance on ice. The index value being equal to or greater than 102 is evaluated as being excellent in braking performance on icy and snowy road surfaces.

TABLE 1

|  | Comparative Example | Example 1 | Example 2 |
|---|---|---|---|
| Pin arrangement | A = B | A > B | A > B |
| Pin arrangement in center region | A1 = A2 | A1 < A2 | A1 = A2 |
| Minimum interval C on same pin arrangement line with respect to interval D between pins closest to each other (C/D) | 2 | 2 | 2 |
| Minimum interval C on same pin arrangement line with respect to ground contact length | 1/4 | 1/4 | 1/4 |
| Minimum interval E on adjacent pin arrangement lines with respect to ground contact length | 1/6 | 1/6 | 1/6 |
| Braking performance on ice | 100 | 102 | 104 |

|  | Example 3 | Example 4 | Example 5 | Example 6 |
|---|---|---|---|---|
| Pin arrangement | A > B | A > B | A > B | A > B |
| Pin arrangement in center region | A1 > A2 | A1 > A2 | A1 > A2 | A1 > A2 |
| Minimum interval C on same pin arrangement line with respect to interval D between pins closest to each other (C/D) | 2 | 3 | 3 | 3 |
| Minimum interval C on same pin arrangement line with respect to ground contact length | 1/4 | 1/4 | 1/2 | 1/2 |
| Minimum interval E on adjacent pin arrangement lines with respect to ground contact length | 1/6 | 1/6 | 1/6 | 1/4 |
| Braking performance on ice | 105 | 107 | 109 | 110 |

Comparison between Comparative Example and Examples 1 to 6 indicates that braking performance on icy and snowy road surfaces is excellent in a case where, for the average interval between the pin arrangement lines, the stud pin installation holes are disposed to satisfy A>B.

Comparison between Example 1 and Examples 2 and 3 indicates that braking performance on icy and snowy road surfaces is further improved by disposing the stud pin installation holes in the center region Ce with A1>A2 or A1=A2 satisfied.

Comparison among Examples 3 to 6 indicates that braking performance on icy and snowy road surfaces is further improved by executing any of disposing stud pin installation holes with C/D≥2.5 satisfied, disposing the stud pin installation holes with the interval C≥the ground contact length/3 satisfied, and disposing the stud pin installation holes with the interval E≥the ground contact length/5 satisfied.

The studdable tire and the pneumatic tire according to the embodiments of the present technology have been described above in detail. However, it should be understood that the present technology is not limited to the above embodiments and examples, and may be improved or modified in various ways so long as these improvements or modifications remain within the scope of the present technology.

The invention claimed is:

1. A studdable tire comprising a plurality of stud pin installation holes in a tread portion,
   a ground contact region of the tread portion including:
   a center region located over a range corresponding to a length of 5 to 25% of a ground contact width from a tire centerline on each of both sides of the tire centerline in a tire width direction; and
   two shoulder regions located on both sides of the center region in the tire width direction,
   in each of the center region and the shoulder regions, two or more of the stud pin installation holes being disposed along each of four or more pin arrangement lines extending in a tire circumferential direction, and
   an average value of adjacent intervals between the pin arrangement lines in the center region is larger than an average value of adjacent intervals between the pin arrangement lines in each of the shoulder regions, wherein
   with respect to each two adjacent intervals of the adjacent intervals between the pin arrangement lines in the center region, a first interval A1 is equal to or larger than a second interval A2 between a pin arrangement line L1 included in two pin arrangement lines defining the first interval A1, the pin arrangement line L1 being located outward in the tire width direction, and a pin arrangement line L2 being outward adjacent to the pin arrangement line L1 in the tire width direction.

2. The studdable tire according to claim 1, wherein the average value of the adjacent intervals between the pin arrangement lines in the center region is 102 to 120% of the average value of the adjacent intervals between the pin arrangement lines in the shoulder regions.

3. The studdable tire according to claim 2, wherein in each of the center region and the shoulder regions, the adjacent intervals between the pin arrangement lines are equal.

4. The studdable tire according to claim 2, wherein in each of the center region and the shoulder regions, the adjacent intervals between the pin arrangement lines decrease on a step-by-step basis or continuously outward in the tire width direction.

5. The studdable tire according to claim 4, wherein an interval C between a first stud pin installation hole and a second stud pin installation hole disposed on a first pin arrangement line of the pin arrangement lines in the center region and being adjacent to each other in the tire circumferential direction is at least 2.5 times as long as an interval D in the tire circumferential direction between the first stud pin installation hole and a third stud pin installation hole disposed on a second pin arrangement line different from the first pin arrangement line and being closest to the first stud pin installation hole.

6. The studdable tire according to claim 5, wherein the interval between two stud pin installation holes disposed on the first pin arrangement line of the pin arrangement lines in the center region and being adjacent to each other in the tire circumferential direction is ⅓ or greater of a ground contact length in the tire circumferential direction.

7. The studdable tire according to claim 6, wherein an interval in the tire circumferential direction between the first stud pin installation hole disposed on the first pin arrangement line of the pin arrangement lines in the center region and a fourth stud pin installation hole disposed on a third pin arrangement line adjacent to the first pin arrangement line and being closest to the first stud pin installation hole is disposed at an interval at least ⅕ of the ground contact length in the tire circumferential direction.

8. A pneumatic tire comprising:
stud pins, and
the studdable tire described in claim 7 including stud pin installation holes in which the stud pins are installed.

9. The studdable tire according to claim 1, wherein
in the center region, each adjacent interval between the pin arrangement lines is equal; and
in the the shoulder regions, each adjacent interval between the pin arrangement lines is equal.

10. The studdable tire according to claim 1, wherein
in each of the center region and the shoulder regions, the adjacent intervals between the pin arrangement lines decrease on a step-by-step basis or continuously outward in the tire width direction.

11. The studdable tire according to claim 1, wherein
an interval C between a first stud pin installation hole and a second stud pin installation hole disposed on a first pin arrangement line of the pin arrangement lines in the center region and being adjacent to each other in the tire circumferential direction is at least 2.5 times as long as an interval D in the tire circumferential direction between the first stud pin installation hole and a third stud pin installation hole disposed on a second pin arrangement line different from the first pin arrangement line and being closest to the first stud pin installation hole.

12. The studdable tire according to claim 1, wherein
the interval between two stud pin installation holes disposed on a first pin arrangement line of the pin arrangement lines in the center region and being adjacent to each other in the tire circumferential direction is ⅓ or greater of a ground contact length in the tire circumferential direction.

13. The studdable tire according to claim 1, wherein
an interval in the tire circumferential direction between the first stud pin installation hole disposed on a first pin arrangement line of the pin arrangement lines in the center region and a fourth stud pin installation hole disposed on a third pin arrangement line adjacent to the first pin arrangement line and being closest to the first stud pin installation hole is disposed at an interval at least ⅕ of the ground contact length in the tire circumferential direction.

14. A pneumatic tire comprising:
stud pins, and
the studdable tire described in claim 1 including stud pin installation holes in which the stud pins are installed.

\* \* \* \* \*